(12) United States Patent
Mistry et al.

(10) Patent No.: US 7,920,478 B2
(45) Date of Patent: Apr. 5, 2011

(54) NETWORK-AWARE ADAPTER FOR APPLICATIONS

(75) Inventors: Nalin Mistry, Nepean (CA); Wayne Ding, Kanata (CA); Zhonghui Yao, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 332 days.

(21) Appl. No.: 12/117,139

(22) Filed: May 8, 2008

(65) Prior Publication Data

US 2009/0279547 A1  Nov. 12, 2009

(51) Int. Cl.
*G06F 11/00* (2006.01)
*H04L 1/00* (2006.01)

(52) U.S. Cl. .......... 370/236; 370/230; 370/252
(58) Field of Classification Search .......... 370/392, 370/252, 352, 236, 238, 250, 223, 230
See application file for complete search history.

(56) References Cited

U.S. PATENT DOCUMENTS

| | | | |
|---|---|---|---|
| 6,859,438 B2 | 2/2005 | Haddock et al. | |
| 6,937,591 B2 | 8/2005 | Guo et al. | |
| 7,230,937 B2 | 6/2007 | Chi et al. | |
| 7,260,840 B2* | 8/2007 | Swander et al. | 726/13 |
| 7,308,711 B2* | 12/2007 | Swander et al. | 726/13 |
| 7,320,029 B2* | 1/2008 | Rinne et al. | 709/223 |
| 7,409,707 B2* | 8/2008 | Swander et al. | 726/13 |
| 7,411,903 B2* | 8/2008 | Jang et al. | 370/230 |
| 7,509,673 B2* | 3/2009 | Swander et al. | 726/11 |
| 2004/0027991 A1* | 2/2004 | Jang et al. | 370/230 |
| 2004/0250131 A1* | 12/2004 | Swander et al. | 713/201 |
| 2007/0028001 A1* | 2/2007 | Phillips et al. | 709/238 |
| 2007/0204154 A1* | 8/2007 | Swander et al. | 713/166 |
| 2008/0004027 A1* | 1/2008 | Chen et al. | 455/445 |
| 2008/0089311 A1* | 4/2008 | Roy et al. | 370/345 |
| 2008/0132268 A1* | 6/2008 | Choi-Grogan et al. | 455/550.1 |
| 2008/0175148 A1* | 7/2008 | Todd et al. | 370/235 |
| 2008/0181116 A1* | 7/2008 | Kavanaugh et al. | 370/236 |
| 2008/0285560 A1* | 11/2008 | Curtis et al. | 370/392 |

OTHER PUBLICATIONS

Madhurima Pawar, Eric Stenson; Windows Filtering Platform and Winsock Kernel: Next Generation Kernel Networking APIs, Microsoft Corporation;retrieved from download.microsoft.com/download/9/8/f/98f3fe47-dfc-4e74-92a3-088782200fe7/TWNE05008_WinHEC05.ppt.
Madhurima Pawar,How to Use The Windows Filtering Platform To Integrate WIth Windows Networking, retrieved from http://download.microsoft.com/download/5/b/9/5b97017b-e28a-4bae-ba48-174cf47d23cd/NET042_WH06.ppt.
PCT International Search Report re: PCT/CA2009/000630 dated Aug. 28, 2009.

* cited by examiner

*Primary Examiner* — Salman Ahmed
*Assistant Examiner* — Chuong T Ho
(74) *Attorney, Agent, or Firm* — Ridout & Maybee LLP

(57) ABSTRACT

Streams of data traffic from various applications may be handled by a network-aware adapter module as part of a greater platform for filtering communicating the streams to intelligent network components. A distinguishing factor associated with a given data stream may be determined and used as a basis for selecting a QoS policy setting for the given data stream. The selected QoS policy setting may then be signaled to a media access control layer to take advantage of the QoS function of the embedded underlying active media type that is active and optimal (both from technical and business perspective) to carry out the communication for the application.

21 Claims, 7 Drawing Sheets

NETWORK-AWARE ADAPTER FOR APPLICATIONS

FIELD OF THE INVENTION

The present application relates generally to handling streams of traffic generated by applications and, more specifically, to a network-aware adapter for communicating the streams to intelligent network components.

BACKGROUND OF THE INVENTION

Applications executed at the application layer of a networked device have traditionally communicated over the network to which the networked device is connected through a simple Media Access Control (MAC) layer. Furthermore, as MAC layers differ for different networking protocols (i.e., different transmission media), applications have been developed taking into consideration specifics of the MAC layer for the particular networking protocol in use in the network to which the device to be connected.

MAC layers associated with newer networking protocols have added complexity that allow an application to specify a Quality of Service (QoS) desired for a particular stream of data traffic that is generated by the application. Often a simple MAC layer lacks the complexity that allows an application to specify a QoS desired for a particular stream of data traffic. Consequently, most applications have not been provided with, or have not been required to have, a degree of intelligence necessary to fully utilize network technology underlying transmissions from the applications.

Such applications, by not having a degree of intelligence, cannot fully take advantage of QoS functions embedded in some new networking technologies, such as WiMAX, nor address some of the unique technical challenges of such new networking technologies. Unfortunately, when the degree of intelligence necessary to take advantage of new networking technologies is built in to new applications, the complexity of the devices designed to execute the new application is increased. Accordingly, the added complexity may drive up the cost of the devices and may push the physical bounds of Application Specific Integrated Circuit technology.

SUMMARY

Streams of data traffic may be handled by a network-aware adapter module as part of a greater platform for filtering communicating the streams to intelligent network components. A distinguishing factor associated with a given data stream may be determined and used as a basis for selecting a QoS Policy setting for the given data stream. The selected QoS Policy setting may then be signaled to a media access control layer.

In accordance with an aspect of the present invention there is provided a method of adapting a data stream before the data stream proceeds to a media access control (MAC) layer, the MAC layer having been adapted to receive QoS Policy settings. The method includes receiving a packet, where the packet is associated with a data stream, determining a distinguishing factor associated with the data stream, selecting, based on the distinguishing factor, a QoS Policy setting for the data stream and signaling the QoS Policy setting to the MAC layer in association with the packet. In other aspects of the present invention, a computing device is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
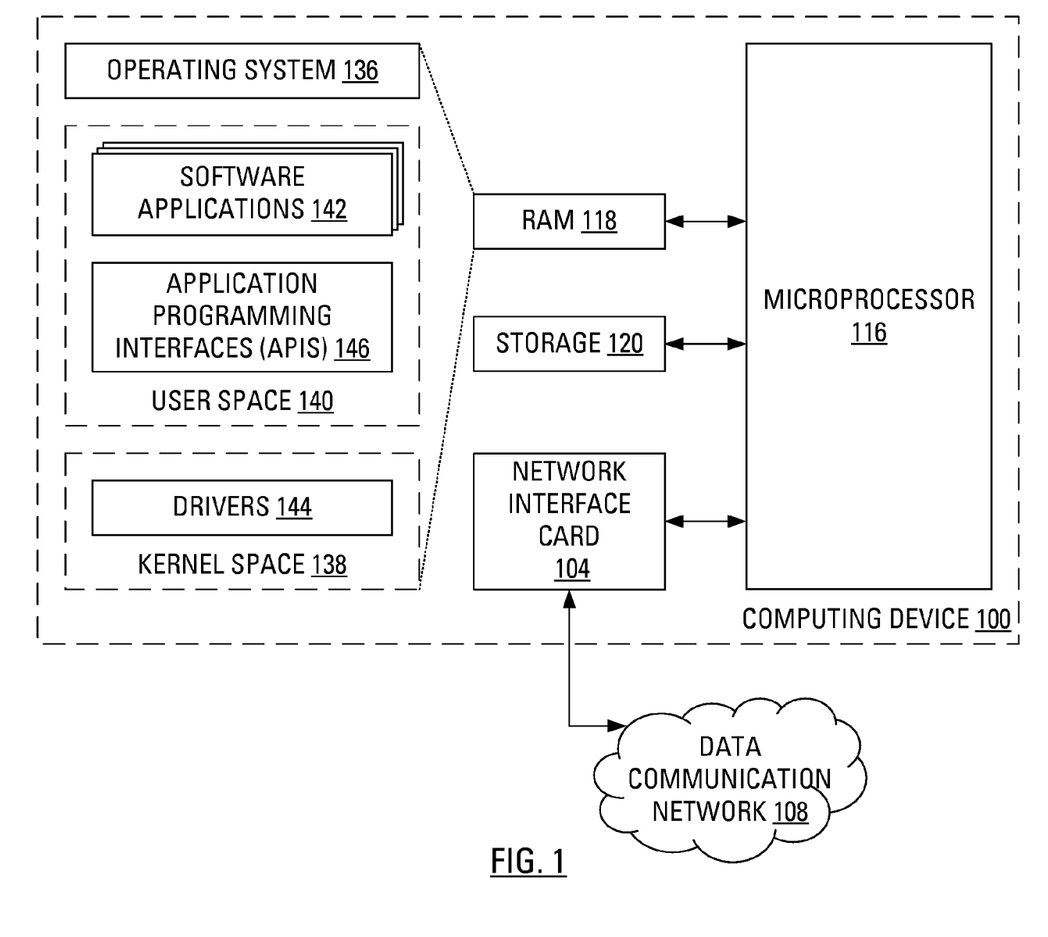
FIG. 1 illustrates interconnection of components of a computing device that may be connected to a data communication network.

FIG. 1 illustrates interconnection of components of a computing device 100 that may be connected, in a wired manner or a wireless manner, to a data communication network 108. The illustrated components of the computing device 100 include a microprocessor 116 and, connected to the microprocessor 116, a storage device 120, a random access memory (RAM) 118 and a network interface card (NIC) 104. The NIC 104 allows for connection of the computing device 100 to the data communication network 108.

The microprocessor 116 operates under stored program control with code being stored in the storage device 120. As depicted in FIG. 1, while operational, the RAM 118 stores programs including an operating system program or code module 136, such as for the known Microsoft Windows™ operating system. Operating systems such as Windows typically divide the RAM 118 space into two portions, namely a user space 140 and a restricted access space, such as a kernel space 138 or functional equivalents thereof. The RAM 118 further stores software applications, indicated generally by reference 142, that typically reside in the user space 140, and drivers 144, which typically reside in the kernel space 138.

Figure 2:
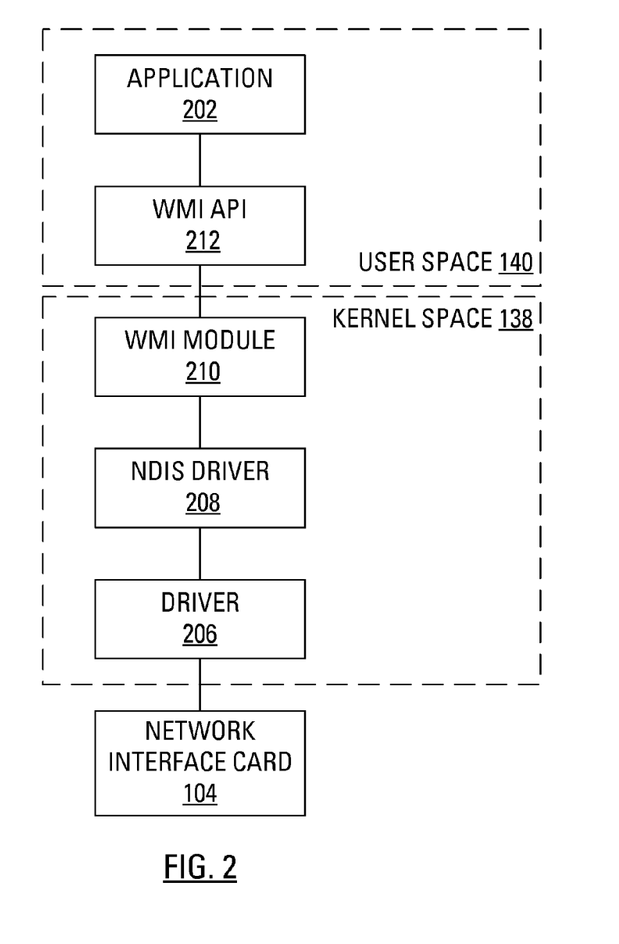
FIG. 2 illustrates a logical structure for communication employing Windows Management Instrumentation.

FIG. 2 illustrates a logical structure for communication employing Windows Management Instrumentation (WMI), where the communication is between an application 202 and the NIC 104. WMI is a set of extensions to the known Windows Driver Model that provides an operating system interface through which instrumented components provide information and notification. WMI is a Microsoft implementation of the Web-Based Enterprise Management (WBEM) standard and the Common Information Model (CIM) standard from the Distributed Management Task Force (DMTF).

The NIC 104 requires a driver 206, selected from among the drivers 144 of FIG. 1. The driver 206, which includes the MAC layer, communicates with a Network Driver Interface Specification (NDIS) driver 208, which is in the kernel space. The NDIS driver 208 implements an API for NICs that was jointly developed by Microsoft and 3Com Corporation. The NDIS is a Logical Link Control (LLC) that forms the upper sublayer of the OSI data link layer (layer 2 of 7) and acts as an interface between the OSI data link layer the Network Layer (layer 3 of 7). The lower sublayer is the MAC device driver. The NDIS is a library of functions often referred to as a "wrapper" that hides the underlying complexity of the hardware of the NIC 104 and serves as a standard interface for level 3 network protocol drivers and hardware-level MAC drivers.

The NDIS driver 208 communicates with a WMI module 210, which is also in the kernel space. The WMI module 210 communicates with a WMI API 212 in the user space. The WMI API 212 communicates with the application 202.

Figure 3:
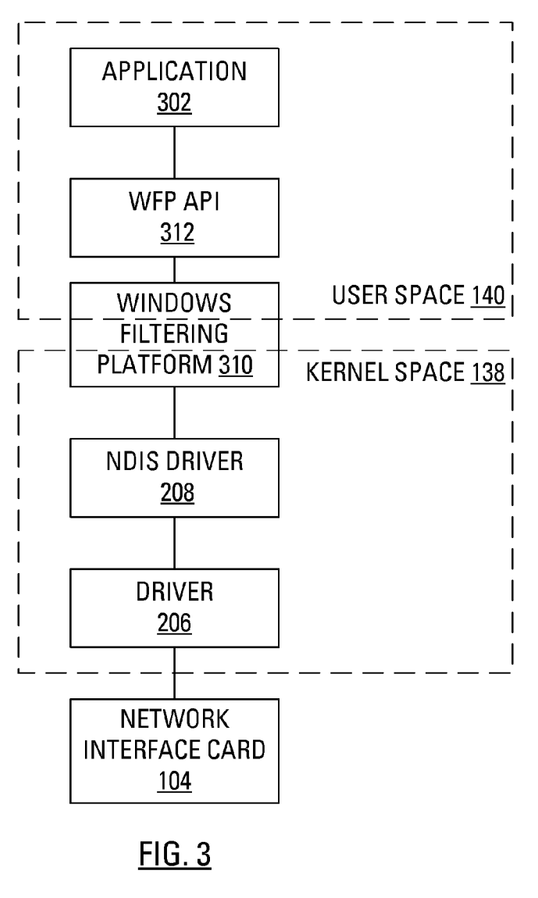
FIG. 3 illustrates a logical structure for communication employing a Windows Filtering Platform.

FIG. 3 illustrates a logical structure for communication employing a Windows Filtering Platform, where the communication is between an application 302 and the NIC 104.

In common with the structure employing WMI as illustrated in FIG. 2, the structure employing WFP as illustrated in FIG. 3 includes the NIC 104 in communication with the driver 206. The driver 206, in turn, communicates with the NDIS driver 208. Distinct from the WMI case of FIG. 1, the NDIS driver 208 communicates with a Windows Filtering Platform (WFP) 310. The WFP 310 straddles the kernel space 138 and the user space 140 and communicates with a WFP API 312 in the user space 140. The WFP API 312 communicates with the application 302.

There is a WFP API included in the Vista™ version of the Microsoft Windows operating system. The WFP API allows applications to tie into the packet processing and filtering pipeline of the new network stack in Windows Vista and Windows Server 2008. The WFP provides features that include integrated communication. Furthermore, the WFP can be configured to invoke processing logic on a per-application basis.

Figure 4:
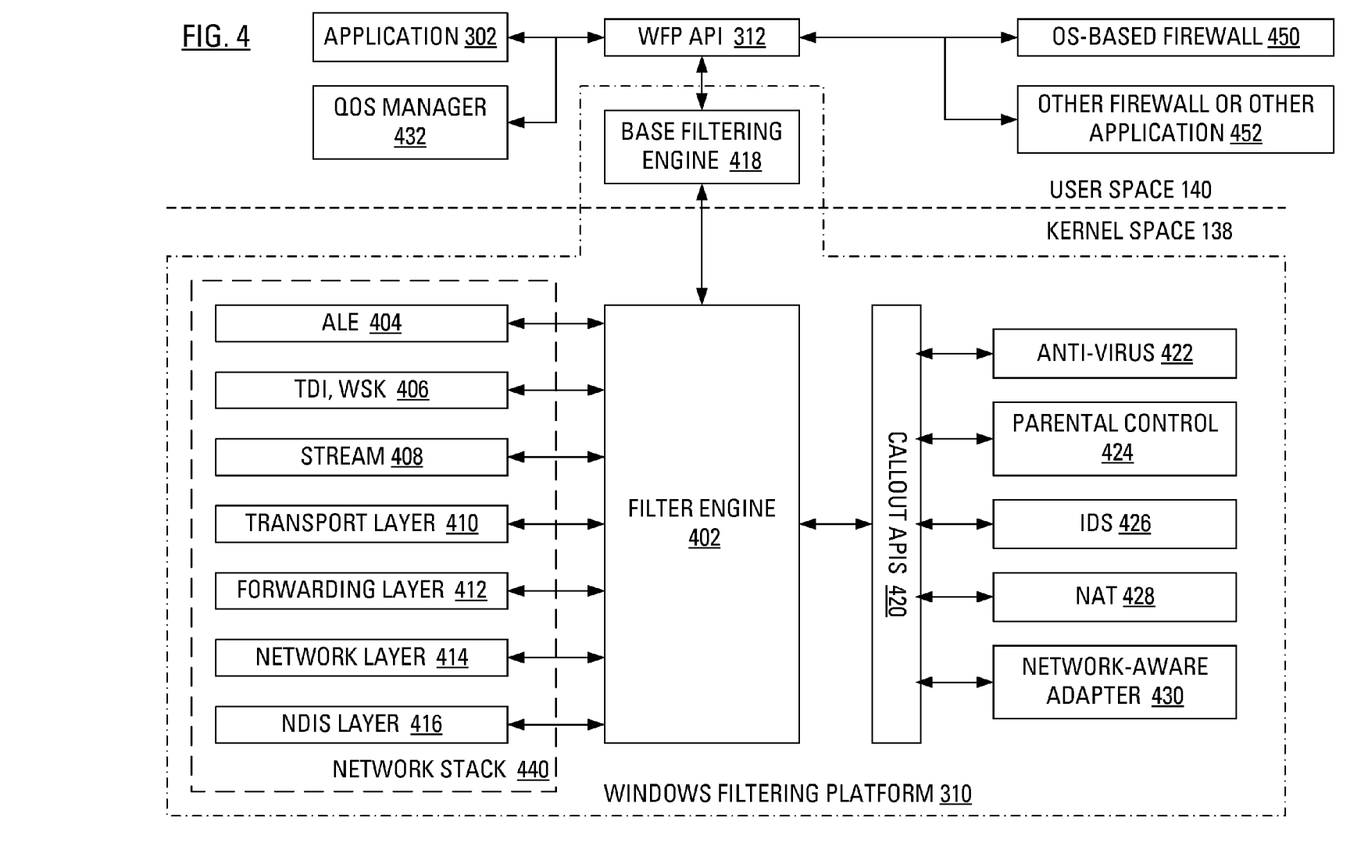
FIG. 4 illustrates a Windows Filtering Platform including a network-aware adapter, a filter engine and a QoS manager in accordance with aspects of the present invention.

When the network to which the computing device 100 connects is a Transport Communication Protocol (TCP) and Internet protocol (IP) network, the network stack 440 may be called a TCP/IP stack.

In view of FIG. 4, the WFP 310 may be implemented as a filtering engine, a network stack 440 and a set of callout modules. The network stack 440 may comprise a plurality of "shims". Shims expose internal structures of a packet as properties. Different shims exist for protocols at different layers. In operation, the filtering engine compares the data in received packets against a specified set of rules. The WFP 310 is considered to, by default, include an in-built set of shims. Furthermore, shims for other protocols can be registered with the filtering engine using the WFP API 312. The in-built set of shims include: an Application Layer Enforcement (ALE) shim 404; a Stream shim 408; Transport Layer Module (TLM) shim 410; and a Network Layer Module (NLM) shim 414. Registered shims illustrated in FIG. 4 include: a Transport Driver Interface Winsock Kernel (TDI WSK) shim 406; a forwarding layer shim 412; and an NDIS layer shim 416.

The filtering engine, which provides basic filtering capabilities, spans across both the kernel space 138 and the user space 140. As identified in FIG. 4, a portion of the filtering engine resident in the kernel space 138 is referred to as a "filter engine" 402 and a portion of the filtering engine resident in the user space 140 is referred to as a "base filtering engine" 418.

The filtering engine matches data in a given packet, which data has been exposed by the shims, against filtering rules. Based on a match between the data and one or more rules, the filtering engine may either permit the given packet to pass through or prevent the given packet from passing through. If another action is necessary, the other action can be implemented through the use of a callout module. The filtering rules are applied on a per-application basis.

The base filtering engine 418 is a module that manages the filtering engine. The base filtering engine 418 accepts filtering rules and enforces a security model specific to an application. The base filtering engine 418 also maintains statistics for the WFP 310 and maintains a log of the state of the WFP 310.

A callout module is a callback function exposed by a filtering driver. The filtering drivers are used to provide filtering capabilities other than the default filtering capability in which packets are either block or permitted to pass through. During registration of a filter rule, a callout module may be specified. When a packet is received having data that matches the filter rule, the filter engine 402 invokes, via a set of callout APIs 420, an associated callout module. The associated callout module then executes some specific filtering capability.

A callout module, which can be registered at all layers, extends the capabilities of the WFP 310. Each callout module has a unique globally unique identifier (GUID). Callout modules may be used for Deep Inspection, i.e., performing complex inspection of network data to determine which data is to be: blocked; permitted; or passed to another filter. Callout modules may be used for Packet Modification, which may include modification of the header or payload of a packet that is received as part of a stream and injection of the modified packet back into the stream. Other uses of callout modules include Stream Modification and Data Logging.

Example callout modules illustrated in FIG. 4 include an anti-virus callout module 422, a parental control callout module 424, an Intrusion Detection System (IDS) callout module 426 and a Network Address Translation (NAT) callout module 428.

In the user space 140 the base filtering engine 418 communicates with the WFP API 312, which, in turn, communicates with applications such as the application 302, an operating system-based firewall 450 and an other application 452 (which may be a further firewall). The WFP API 312 is also in communication with a QoS manager 432, for implementing aspects of the present invention.

In overview, the QoS manager 432 configures the network-aware adapter callout module 430 to prioritize streams from the application 302, the OS-based firewall 450 and the other application 452. As will be clear to a person of ordinary skill in the art, the applications 302, 450, 452 illustrated in FIG. 4 are merely examples and there may be more or fewer or different applications as required by the computing device 100 (FIG. 1).

In carrying out the prioritization, the network-aware adapter callout module 430 interacts with the MAC layer (not shown) in the driver 206. Additionally, the network-aware adapter callout module 430 interacts with the applications 302, 450, 452 and with policy. As will be clear to a person of ordinary skill in the art, various policies regarding handling of streams from the applications 302, 450, 452 may be received, by the computing device 100, from a central directory.

The role of the adapter callout module 430 is to make intelligent use of signaling to achieve end-to-end QoS through the use of policies and/or service characterizations. The network-aware adapter callout module 430 can further: manage QoS and spectrum efficiency trade offs; manage terminal operation responses and power reservation tradeoffs;

and manage other network intelligence that can be embedded, such as Location Based Services (LBS) and Multicast Broadcast Services (MBS).

In operation, the filter engine 402 is structured as a set of layers of filters, with each layer having an associated priority. A given stream can be blocked even if a higher priority filter has permitted the given stream. The filter structure allows multiple actions to be performed on the same stream. The layers in the filter engine 402 are divided into sub-layers. Within a sub-layer filters are evaluated in weight order. Evaluation stops at first match (permit/block). When a match occurs between a stream and a filter, a related callout module is notified. If the notified callout returns continue, the next matching filter is evaluated. Notably, streams are evaluated at each sub-layer.

Figure 5:
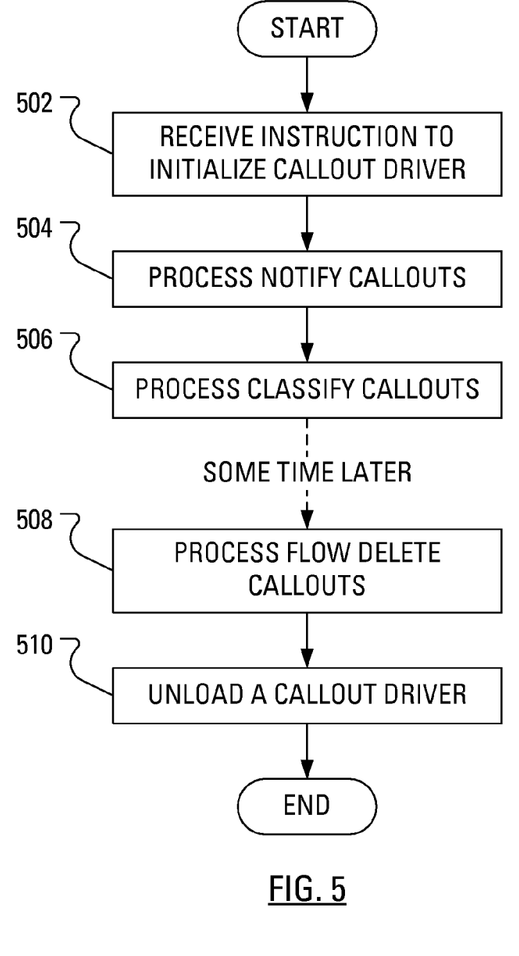
FIG. 5 illustrates steps in an example method of operation of the filter engine of FIG. 4 in accordance with an aspect of the present invention.

In operation, in relation to a stream forthcoming from the application 302, the QoS manager 432 transmits an instruction to the filter engine 402 to initialize a callout driver for the network-aware adapter callout module 430. In particular, the instruction may specify an unload function. Upon receiving (step 502, FIG. 5) the instruction to initialize the callout driver, the filter engine 402 may create a device object and register the network-aware adapter callout module 430.

Figure 6:
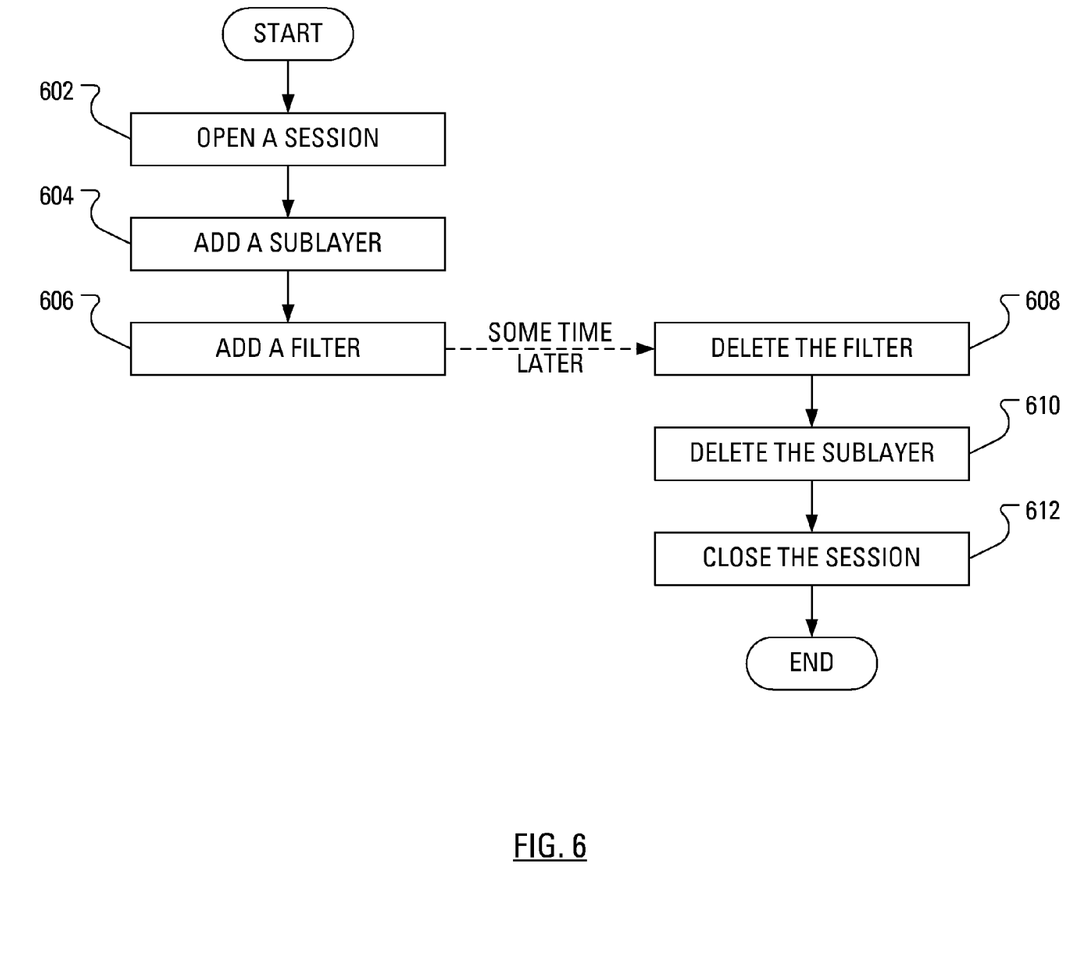
FIG. 6 illustrates steps in an example method of operation of the QoS manager of FIG. 4 in accordance with an aspect of the present invention.

Operation of the QoS manager 432 may be further considered in view of FIG. 6. Initially, the QoS manager 432 opens a session (step 602) to the filter engine 402. The QoS manager 432 then instructs the filter engine 402 to add a sub-layer (step 604) to the structure of the filter engine 402 and instructs the filter engine 402 to add a filter (step 606) to the just-added sub-layer.

Responsive to receiving the instruction to add the filter in step 606, the filter engine 402 may add the requested filter and may process a notify function (step 504, FIG. 5), commonly called "Notifyfn()", to indicate the addition of the filter to the network-aware adapter callout module 430.

As packets of the stream coming from the application 302 for which the filter has been established arrive in the network stack 440, the packets are processed by the filter engine 402.

In particular, the filter engine 402 may process a classify function (step 506, FIG. 5), commonly called "Classifyfn()", to indicate, to the network-aware adapter callout module 430, the arrival, in the network stack 440, of the packets of the stream coming from the application 302 for which the filter has been established.

Figure 7:
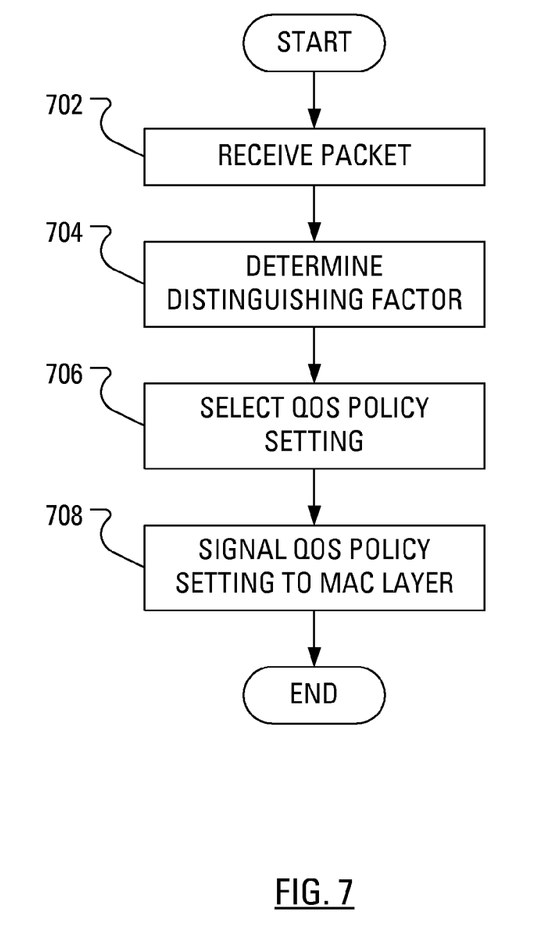
FIG. 7 illustrates steps in an example method of operation of the network-aware adapter of FIG. 4 in accordance with an aspect of the present invention.

FIG. 7 illustrates steps in an example method of adapting the stream at the network-aware adapter callout module 430.

In particular, the network-aware adapter callout module 430 initially receives (step 702) a packet of the stream and determines (step 704) a distinguishing factor associated with the stream. Subsequently, the network-aware adapter callout module 430 selects (step 706), based on the distinguishing factor, a QoS Policy setting for the data stream. Finally, the network-aware adapter callout module 430 modifies the stream data to signal (step 708) the selected QoS Policy setting to the MAC layer (not shown) in the driver 206.

At the packet level, to modify the stream data to signal (step 708) the selected QoS Policy setting to the MAC layer, the network-aware adapter callout module 430 may make a clone of the packet received in step 702. The network-aware adapter callout module 430 may then modify the clone to form a modified clone, where the modified clone incorporates a signal representative of the selected QoS Policy. The network-aware adapter callout module 430 may then inject the clone, using Classifyfn(), into the network stack 440.

The term "QoS Policy setting" is used herein to be more encompassing than the known term "Quality of Service". The term Quality of Service is known to include settings for bit rate, delay, jitter and packet error rate. In addition to these settings, the term "QoS Policy setting" is used herein to further include user priority or user group priority, etc.

The distinguishing factor may be, for instance, an identification of the application 302 that is the origin of the stream, an identification of a subscriber associated with the stream or an identification of a media type for the data within the stream.

Where the data stream is a stream of a plurality of Internet Protocol (IP) packets, the determining the distinguishing factor (step 704) may involve inspecting a header field in a given packet among the plurality of IP packets. In which case, the distinguishing factor may be, for instance, a source IP address, a destination IP address, a source port or a destination port.

Where the distinguishing factor is the identity of the application 302, the selection (step 706, FIG. 7) of the QoS Policy setting may be based on a priority level associated with the application 302. Additionally, the identity of the application 302 may be associated with a type of application and the selection (step 706, FIG. 7) of the QoS Policy setting may be based on the type associated with the application 302. Example application types include video, voice, gaming, collaboration and instant messaging.

The distinguishing factor may be, for instance, an identification of a subscriber associated with the application 302 that is the origin of the stream.

Alternatively, the distinguishing factor may be, for instance, an identification of the media type of the link between the network interface card 104 and the data communication network 108 (see FIG. 1). The media type may be defined as, for instance, wired Ethernet as defined by the Institute for Electrical and Electronics Engineers (IEEE) standards related to IEEE 802.3, such as: 10 Megabit per second Ethernet; Fast Ethernet; Gigabit Ethernet; or 10 Gigabit Ethernet.

Additionally, the media type may be defined as, for instance, "WiFi", meaning wireless networking as defined by the Institute for Electrical and Electronics Engineers (IEEE) standards such as: IEEE 802.11a, IEEE 802.11b, IEEE 802.11g or IEEE 802.11n.

Furthermore, the media type may be defined as, for instance, "WiMAX" for Worldwide Interoperability for Microwave Access, meaning wireless networking as defined by the IEEE 802.16-2004 standard and the IEEE 802.16e-2004 amendment.

The media type may also be defined as, for instance, "Long Term Evolution (LTE)". Long Term Evolution is the name given to a project within the Third Generation Partnership Project (3GPP, see www.3gpp.org) to improve the Universal Mobile Telecommunications System mobile phone standard, which is also maintained by 3GPP, to cope with future requirements.

When the stream being processed by the filter engine 402 and the network-aware adapter callout module 430 is terminated, the filter engine 402 processes a Flow Delete function (step 508, FIG. 5), commonly called "Flowdeletefn()", to indicate, to the network-aware adapter callout module 430, that the stream has terminated.

Furthermore, the QoS manager 432 may delete (step 608, FIG. 6) the filter.

Responsive to the deletion of the filter in step 608, the filter engine 402 may process the notify function to indicate the deletion of the filter to the network-aware adapter callout module 430.

Additionally, the QoS manager 432 may delete (step 610, FIG. 6) the sublayer and close (step 612) the session opened in step 602. Responsive to the closing of the session, the filter engine 402 may unload (step 510, FIG. 5) the callout driver.

In operation of the computing device 100, a user may employ a user interface to select an application to execute. The computing device 100 may be, for instance, a portable (i.e., notebook) computer and the selected application may be a video transmission application. Furthermore, the connection between the network interface card 104 and the data communication network 108 may be a WiMAX connection. Accordingly, the MAC layer in the driver 206 is a WiMAX MAC layer. The WiMAX MAC layer is known to accept specification of QoS parameters. The QoS manager 432 configure a filter in the filter engine 402 to send packets in the stream from the video transmission application to the network-aware adapter 430. Furthermore, the network-aware adapter 430, upon determining that the data in the stream is video, selects a 200 kilobit per second bandwidth and modifies the packets in the stream to signal to the WiMAX MAC layer that the stream should receive a 200 kilobit per second bandwidth.

At the WiMAX MAC layer, the modified packets in the stream are received and the signaling is processed. According to the processing, the WiMAX MAC layer may reserve a 200 kilobit per second bandwidth through the data communication network 108 to the destination of the video stream. The WiMAX MAC layer may then arrange the transmission of the video stream through the data communication network 108 to the destination.

In alternative scenario, the user of the computing device 100 may specify QoS Policy parameters. These parameters can be detailed and common QoS parameters such as bit rate, delay, jitter and packet loss which can be translated directly to QoS embedded in the underlying media type. However, not all media types support all or any QoS parameters configured. In that case, the network-aware adapter 430 may do the mapping based on media type.

The foregoing provides a method for adapting a data stream such that a selected QoS Policy setting can be signaled to a MAC layer. However, it has not been considered, thus far, how to handle a scenario wherein the current network conditions will not allow the signaled QoS Policy settings. In such a case, the network-aware adapter 430 may schedule traffic in the stream associated with the QoS Policy settings according to best efforts. Alternatively, especially where the QoS Policy setting is associated with an all-or-nothing approach, the network-aware adapter 430 may reject the stream and inform the origin application and, in turn, the user. Further alternatively, especially where the QoS Policy setting is associated with a the QoS policy is associated with a "degradation is acceptable" approach, the network-aware adapter 430 may schedule traffic in the stream with degraded QoS settings. For some network media types, their QoS status (e.g., available bandwidth) can be monitored and fed back to the network-aware adapter 430 (through the QoS manager 432).

Advantageously, the network-aware adapter 430, when executing according to an aspect of the present invention, can be seen to mediate between the application layer and the MAC layer, thereby reducing a necessity for complexity in the applications executed at the application layer. The network-aware adapter 430 can be arranged to enable the specification of QoS parameters at the MAC layer. When used properly, the specified QoS parameters can be used to improve spectrum efficiency and facilitate management of complexities inherent in the data communication network 108.

Advantageously, an application can be developed in anticipation of interaction with the network-aware adapter 430 rather than interaction with the MAC layer that has been designed specifically for a particular networking technology.

As should be clear to a person of ordinary skill in the art, although aspects of the present invention have been presented in the context of the known Windows Filtering Platform (WFP), the use of the WFP is not essential to the operation of aspects of the invention and merely serves as an example of an environment in which aspects of the present invention may be implemented.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. The method of adapting a data stream before said data stream proceeds to a media access control (MAC) layer, said method comprising:
   said MAC layer having been adapted to receive a QoS Policy setting;
   receiving a packet, where said packet is associated with a data stream;
   determining a distinguishing factor associated with said data stream;
   selecting, based on said distinguishing factor, a QoS Policy setting for said data stream; and
   signaling said QoS Policy setting to said MAC layer in association with said packet, said signaling including:
      making a clone of said packet;
      modifying said clone to form a modified clone, where said modified clone incorporates a signal representative of said QoS Policy setting; and
   injecting said clone into said media access control (MAC) layer;
      wherein said distinguishing factor comprises an identification of an application associated with said data stream;
      wherein said application is associated with a priority level and said selecting said QoS Policy setting for said data stream comprises basing said selecting on an association between said priority level and said QoS Policy setting.

2. The method of claim 1 wherein said QoS Policy setting includes a quality of service setting.

3. The method of claim 1 wherein said QoS Policy setting includes a user experience setting.

4. The method of claim 1 wherein said data stream is a stream of a plurality of Internet Protocol (IP) packets and said determining said distinguishing factor comprises inspecting a header field in a given packet among said plurality of IP packets.

5. The method of claim 4 wherein said header field holds an indication of a source address for said given packet.

6. The method of claim 4 wherein said header field holds an indication of a destination address for said given packet.

7. The method of claim 4 wherein said header field holds an indication of a source port for said given packet.

8. The method of claim 4 wherein said header field holds an indication of a destination port for said given packet.

9. The method of claim 1 wherein said application comprises a video application.

10. The method of claim 1 wherein said application comprises a voice application.

11. The method of claim 1 wherein said application comprises a gaming application.

12. The method of claim 1 wherein said application comprises a collaboration application.

13. The method of claim 1 wherein said application comprises an instant messaging application.

14. The method of claim 1 wherein said distinguishing factor comprises an identification of a subscriber associated with said data stream.

15. The method of claim 1 wherein said distinguishing factor comprises an identification of a media type associated with said data stream.

16. The method of claim 15 wherein said media type comprises a wired networking technology based on a IEEE 802.3 standard.

17. The method of claim 15 wherein said media type comprises a wireless networking technology based on a IEEE 802.11 standard.

18. The method of claim 15 wherein said media type comprises a wireless networking technology based on a IEEE 802.16 standard.

19. The method of claim 15 wherein said media type comprises a wireless networking technology based on a standard emerging from the 3GPP™ Long Term Evolution (LTE™) project.

20. A computing device comprising:
  a processor adapted to execute a filtering platform having a module adapted to:
  receive a packet, where said packet is associated with a data stream; determine a distinguishing factor associated with said data stream;
  select, based on said distinguishing factor, a QoS Policy setting for said data stream; and
  signal said QoS Policy setting to a media access control layer in association with said packet, said media access control (MAC) layer having been adapted to receive said QoS Policy setting, said module adapted to signal by:
  making a clone of said packet;
  modifying said clone to form a modified clone, where said modified clone incorporates a signal representative of said QoS Policy setting; and
  injecting said clone into said media access control (MAC) layer;
  wherein said distinguishing factor comprises an identification of an application associated with said data stream;
  wherein said application is associated with a priority level and said selecting said QoS Policy setting for said data stream comprises basing said selecting on an association between said priority level and said QoS Policy setting.

21. A non-transitory computer readable medium containing computer-executable instructions that, when performed by a processor, cause said processor to:
  receive a packet, where said packet is associated with a data stream;
  determine a distinguishing factor associated with said data stream;
  select, based on said distinguishing factor, a QoS Policy setting for said data stream; and
  signal said QoS Policy setting to a media access control layer in association with said packet, said media access control (MAC) layer having been adapted to receive said QoS Policy setting, said causing said processor to signal including causing said processor to:
  make a clone of said packet;
  modify said clone to form a modified clone, where said modified clone incorporates a signal representative of said QoS Policy setting; and
  inject said clone into said media access control (MAC) layer;
  wherein said distinguishing factor comprises an identification of an application associated with said data stream;
  wherein said application is associated with a priority level and said selecting said QoS Policy setting for said data stream comprises basing said selecting on an association between said priority level and said QoS Policy setting.

* * * * *